US009666008B2

(12) United States Patent
Hill

(10) Patent No.: US 9,666,008 B2
(45) Date of Patent: May 30, 2017

(54) OPTICALLY VARIABLE SECURITY DEVICE, AND ARTICLE EMPLOYING SAME AND METHOD FOR VERIFYING THE AUTHENTICITY OF AN ARTICLE

(75) Inventor: Dean R. Hill, New Freedom, PA (US)

(73) Assignee: OPSEC SECURITY GROUP, INC., Denver, CO (US)

( * ) Notice: Subject to any disclaimer, the term of this patent is extended or adjusted under 35 U.S.C. 154(b) by 873 days.

(21) Appl. No.: 12/854,595

(22) Filed: Aug. 11, 2010

(65) Prior Publication Data

US 2011/0049862 A1 Mar. 3, 2011

Related U.S. Application Data

(60) Provisional application No. 61/238,883, filed on Sep. 1, 2009.

(51) Int. Cl.

| | |
|---|---|
| ***B42D 15/00*** | (2006.01) |
| ***B42D 15/10*** | (2006.01) |
| ***G09C 3/00*** | (2006.01) |
| ***G07D 7/00*** | (2016.01) |
| ***G07D 7/12*** | (2016.01) |

(52) U.S. Cl.

CPC ........... *G07D 7/0033* (2013.01); *G07D 7/125* (2013.01)

(58) Field of Classification Search

USPC .............. 283/67, 70, 72, 73, 74, 86, 91, 110

See application file for complete search history.

(56) References Cited

U.S. PATENT DOCUMENTS

| | | | | |
|---|---|---|---|---|
| 3,833,795 | A | 9/1974 | Shoshani et al. | |
| 4,270,774 | A * | 6/1981 | Barnes | 283/62 |
| 4,463,250 | A | 7/1984 | McNeight et al. | |
| 5,283,422 | A | 2/1994 | Storch et al. | |
| 5,367,148 | A | 11/1994 | Storch et al. | |
| 5,422,954 | A | 6/1995 | Berson | |
| 5,592,561 | A | 1/1997 | Moore | |
| 5,598,477 | A | 1/1997 | Berson | |
| 5,768,384 | A | 6/1998 | Berson | |
| 5,818,021 | A | 10/1998 | Szewczykowski | |

(Continued)

FOREIGN PATENT DOCUMENTS

| | | | |
|---|---|---|---|
| WO | WO 0073991 A1 | | 12/2000 |
| WO | WO 2008000351 A2 | * | 1/2008 |
| WO | WO 2008093093 | | 8/2008 |

OTHER PUBLICATIONS

Extended European Search Report issued Dec. 28, 2010 for European Application No. 10009036.4.

*Primary Examiner* — David Bryant
*Assistant Examiner* — Justin V Lewis
(74) *Attorney, Agent, or Firm* — John P. Powers; Grant E. Coffield; Eckert Seamans Cherin & Mellott, LLC

(57) ABSTRACT

A security device and method are provided for verifying the authenticity of articles, tracking articles, detecting the diversion of articles, and detecting the production of unauthorized articles. The security device includes a substrate and an optically variable security code. The security device may further include a machine-readable representation of the security code. The security device may still further include a unique serial number, which may be machine-readable. The substrate may be an article or, alternatively, the security device may be affixed to an article. An article including at least one of the security devices is also disclosed.

15 Claims, 6 Drawing Sheets

(56) References Cited

U.S. PATENT DOCUMENTS

| | | | | |
|---|---|---|---|---|
| 5,900,954 | A | 5/1999 | Katz et al. | |
| 5,974,150 | A | 10/1999 | Kaish et al. | |
| 6,005,960 | A | 12/1999 | Moore | |
| 6,069,955 | A | 5/2000 | Coppersmith et al. | |
| 6,085,903 | A * | 7/2000 | Jotcham et al. | 283/83 |
| 6,246,778 | B1 | 6/2001 | Moore | |
| 6,409,082 | B1 | 6/2002 | Davis et al. | |
| 6,442,276 | B1 | 8/2002 | Doljack | |
| 6,456,729 | B1 | 9/2002 | Moore | |
| 6,547,137 | B1 | 4/2003 | Begelfer et al. | |
| 6,788,800 | B1 | 9/2004 | Carr et al. | |
| 7,062,065 | B2 | 6/2006 | Dowdy | |
| 7,137,566 | B2 | 11/2006 | Silverbrook et al. | |
| 7,207,481 | B2 | 4/2007 | Barenburg et al. | |
| 7,222,791 | B2 | 5/2007 | Heilper et al. | |
| 2003/0108373 | A1 | 6/2003 | Schofield | |
| 2003/0179902 | A1 | 9/2003 | Ambrogio et al. | |
| 2004/0150220 | A1* | 8/2004 | Holmes et al. | 283/110 |
| 2005/0010776 | A1 | 1/2005 | Kenen et al. | |
| 2005/0097054 | A1 | 5/2005 | Dillon | |
| 2005/0234823 | A1 | 10/2005 | Schimpf | |
| 2006/0180661 | A1 | 8/2006 | Grant et al. | |
| 2006/0255130 | A1 | 11/2006 | Whewell et al. | |
| 2007/0075125 | A1 | 4/2007 | Muscat | |
| 2007/0100761 | A1 | 5/2007 | Dillon | |
| 2007/0158433 | A1 | 7/2007 | Schwenk et al. | |
| 2007/0170241 | A1 | 7/2007 | Grant et al. | |
| 2008/0128496 | A1 | 6/2008 | Bertranou et al. | |
| 2009/0072526 | A1* | 3/2009 | Peters et al. | 283/85 |
| 2009/0322071 | A1* | 12/2009 | Dichtl | 283/70 |

* cited by examiner

OPTICALLY VARIABLE SECURITY DEVICE, AND ARTICLE EMPLOYING SAME AND METHOD FOR VERIFYING THE AUTHENTICITY OF AN ARTICLE

RELATED APPLICATION

This application claims the benefit of Provisional Application No. 61/238,883, filed on Sep. 1, 2009 and entitled, "OPTICALLY VARIABLE SECURITY DEVICE, AND ARTICLE EMPLOYING SAME AND METHOD FOR VERIFYING THE AUTHENTICITY OF AN ARTICLE"

BACKGROUND

Field

The disclosed concept relates generally to anti-counterfeiting measures, and more particularly, to a device and method for authenticating articles, tracking articles, detecting the diversion of articles, and detecting the production of unauthorized articles. The disclosed concept further relates to articles employing optically variable security devices.

Description of Related Art

In the consumer products industry, counterfeiting is a significant and growing problem. Fashion and luxury products have long been the target of counterfeiters, but nearly any branded product can be and has been the subject of counterfeiting. For example, products such as shampoo, automotive parts, baby formula, pharmaceuticals, candy, and even beer have been counterfeited. Branded, certified and copyrighted products are especially common targets of counterfeiting. Counterfeiting is difficult to detect, investigate, and quantify, and consequently, it is difficult for brand owners to know the full extent of the problem. However, by some estimates, between 5 and 7 percent of all world trade is in counterfeit products, amounting to an annual value that could rise to nearly $1 trillion in 2009.

In a traditional counterfeiting scheme, an individual or group of individuals produces, packages, and attempts to sell products with the intent to deceptively represent the product's authenticity and/or source. Typically, the quality of the counterfeit is less than the original product the counterfeit was designed to imitate. Consequently, consumers that unknowingly purchase counterfeit products are being defrauded. In some cases, such as with drugs, medicines, and automotive parts, when a consumer unknowingly purchases a counterfeit product, the results can be dire.

Counterfeiting has a significant impact on brand owners as well. Perhaps the most obvious negative effect counterfeiting has on companies is lost revenue and profit. Less obvious but equally important is the potential damage counterfeits can cause to a company's brand equity. For example, a single highly-publicized negative incident caused by the use of a counterfeit can cause immeasurable damage to a company's reputation.

The cost to society of counterfeit products is significant. Revenues from selling counterfeits support various nefarious activities including syndicated crime, prostitution, human-trafficking, child labor, and terrorist activities. Counterfeiting contributes to unemployment, helps create budget deficits, and poses a threat to global health and safety.

Documents, particularly those of value and those that are certified, for example and without limitation, banknotes, bonds, checks, credit cards, stamps, tickets, coupons, passports, identification (ID) cards, licenses, and certificates, are also widely counterfeited. Counterfeit identity documents are commonplace and often used in identity theft crimes.

Several techniques have been used, developed, or proposed for preventing the counterfeiting of products and documents. The development of trademarks and logos (i.e., branded products) and document seals were early attempts by manufacturers and document providers to verify to consumers the origin of their products and documents. However, it is relatively easy for a counterfeiter to copy trademarks, logos, and seals.

A more recent technique aimed at preventing counterfeiting is to attach radio frequency identification (RFID) tags to products when they are initially manufactured or packaged. A product can later be authenticated by verifying the unique identifying data transmitted by the RFID tag. However, adding an RFID tag to each product increases the overall cost of the product. Further, the equipment (e.g., RFID sensors or readers) needed to verify the RFID tag are costly and may only be available to certain entities in the product's distribution chain, and are almost certainly not available to consumers. In addition, the RFID tags themselves and the codes within them are also subject to counterfeiting. Thus, this technique is neither effective nor economical.

Yet another approach to preventing counterfeiting is the marking of products, documents, labels, or product packaging with an identifying mark in a format that is difficult or impossible to counterfeit, such as color-shifting inks, tamper labels, watermarks, intaglio inks, ultraviolet inks, and other devices that are difficult to copy. This technique also offers drawbacks. As copying and printing technologies become more sophisticated, economical, and available to counterfeiters, brand owners and document issuers must resort to more and more sophisticated labels and markings to keep one step ahead. This results in increased costs as brand owners must constantly develop and implement new markings that cannot be copied with current copying technology. It also results in an identifying mark that becomes so complex that it is often too confusing or difficult for consumers to recognize. Consequently, there remains a need for an effective and economical anti-counterfeiting system wherein it is easy for consumers to validate authenticity.

One marking technique well known in the art is the use of optically variable devices. An optically variable device (OVD) is a visual device that creates a change or shift in appearance, such as a change in color or shape, when observed from different relative observation points. The evolution of the OVD as a security device stems largely from its ability to exhibit optical effects that cannot be reproduced using traditional printing and/or photocopying processes. OVDs can be based on several technologies, such as for example and without limitation, holographic effects, diffractive gratings, liquid crystal effects, color-shifting inks or pigments, and micro-lens integral and autostereoscopic imaging techniques.

Despite advances in digital imaging technologies in recent years, the best color copiers and computer-based imaging systems available today are not capable of reproducing OVD images. OVDs can only be reproduced by sophisticated and expensive, often proprietary, processes and equipment that most counterfeiters lack. For example, sophisticated holographic origination equipment is needed to reproduce holographic OVDs. Thus, one of the important reasons OVDs continue to be used as security devices to prevent counterfeiting is that they defeat the widespread use of readily available imaging and printing technologies by those counterfeiters who, up to a certain level of skill and resources, might otherwise engage in counterfeiting and falsification of products and documents. Further, many counterfeiters are capable of producing and distributing large quantities of products or documents that, aside from the OVD security images, are indistinguishable from authentic versions. Thus, a second important reason for using OVDs as security devices to prevent counterfeiting is that they provide a focal point for distinguishing authentic products from those supplied by professional counterfeiters.

However, for perpetrators above this certain level of skill and resources, counterfeiting and falsification of products and documents continues to evolve. These perpetrators continue to invest in the technologies and skills necessary to duplicate even OVD security images. Thus, the use of OVD security images alone is insufficient to confirm the authenticity of false products or documents produced by counterfeiters having a certain level of skill and resources.

Another approach to preventing counterfeiting is the marking of products, documents, labels, or product packaging with random or serialized numbers or symbols that are either encrypted or stored in a central database. For example, U.S. Pat. No. 6,442,276 discloses a method of verifying the authenticity of a product by marking the product with a random code number and storing the code number in a database. The product's authenticity is verified by comparing the number marked on the product with numbers stored in the database. However, the method does not protect against the counterfeiting of code numbers; faced with two products that have both been marked with the same valid number, the method cannot distinguish between a counterfeit product and an authentic product.

In a similar approach, a particular random characteristic of a product, document, label, or packaging is used to create a unique "fingerprint" of the article to be protected. These methods also have drawbacks. For example, U.S. Pat. No. 5,974,150 discloses a method of authenticating a product or document by affixing a label to the product or document into which fluorescent, dichroic fibers have been randomly embedded. The random pattern of the fibers is measured by a special apparatus and converted to a numeric code. The code is stored in a database and/or encrypted and printed on the label. At a remote site, another apparatus is used to measure the fiber pattern and the resulting code is compared with the code in the database or with the decrypted code appearing on the label. Although secure in verifying single articles, this method is unwieldy for mass produced products or documents because it introduces significant costs in the form of the special reading apparatus, which would be required everywhere in the field where authentication is desired. Further, it is likely that many consumers would not have access to one of the special readers, so will be unable to authenticate their products or documents.

Therefore, there is a need for a method and device to verify the authenticity of products and documents that is relatively low in cost, secure against counterfeits made by perpetrators of all levels of skill and resources, easy to apply, and easy to authenticate.

SUMMARY OF THE INVENTION

These needs and others are met by embodiments of the disclosed concept, which are directed towards a security device comprising a substrate and an optically variable security code. The disclosed concept is also directed towards an article coupled to a security device comprising an optically variable security code, such as a product or document. Further, the disclosed concept is directed towards a method for verifying the authenticity of an article comprising the steps of: (a) producing a security device, said device comprising an optically variable security code; (b) marking the device with a unique serial number; (c) recording the associated security code and serial number in a database; and (d) providing the security device for affixing to an article, wherein authentication is confirmed if the security code and serial number on the device-affixed article is the same as an associated security code and serial number recorded in the database.

In one embodiment, the security device may be a label that is affixed to an article with a pressure sensitive adhesive; however, the device may be in any known or suitable form, such as for example and without limitation, a hot stamping foil, transfer film, laminate, security thread, security stripe, or security patch. The security device may also be integrated into the product or document, such as for example and without limitation, in the case of an optical disc. In this case, the substrate is an integral part of the product or document.

The security device may include an optically variable security code formed by one or more optically variable techniques, such as for example and without limitation, holograms, diffractive gratings, liquid crystal constructs, color-shifting inks or pigments, or micro-lens integral or autostereoscopic imaging techniques. The optically variable constructs may display a security code comprising a random set of alphanumeric characters, shapes, icons or images that are formed so that a single such character, shape, icon or image or a unique set of characters, shapes, icons or images can be viewed from a given observation point. To read the security code, a user may tilt the security device horizontally or vertically, revealing each character, shape, icon or image individually, or unique set thereof, in sequence.

The security device may also include an optically variable security image, such as for example and without limitation, a hologram, diffractive grating, liquid crystal construct, color-shifting ink or pigment, or micro-lens integral or autostereoscopic imaging device, to deter counterfeiting. In one non-limiting embodiment, all security devices intended for a group of like articles may exhibit the same optically variable image, but each security device exhibits one of many possible security codes. The devices thus serve to resist counterfeiting because they cannot be copied by photographic or xerographic methods, and because the security codes of successive devices, being assigned randomly, cannot be guessed by counterfeiters.

In one non-limiting embodiment, the security device may further comprise a unique serial number which gives each device a unique identity to enable the control, tracking, and auditing of the supply of security devices to remote production sites anywhere in the world. The serial number may be marked by any known or suitable means, such as for example and without limitation, printing or laser ablation or engraving, and may be machine readable. The serial number allows a brand owner or government agency to control the number of authorized articles, as well as a way to track their origin and movement.

The inventive security device and verification method may be fully integrated with any existing track and trace system or operation. The results of production and field control scans can be integrated with the inventive verification database to provide full monitoring of individual marked products and documents, reports to help manage the movement of articles through the supply and use chain, and notification alerts of particular events, such as the location and time of a detection of counterfeit articles.

For example, a brand owner or issuing government agency may first authorize the production of some quantity of products or documents. A security provider may then manufacture and supply the given quantity of devices to the production site where one device is affixed to each authorized article during production. Each device may exhibit a random optically variable security code and may further exhibit an optically variable image. The security codes need not be unique to each device, i.e., there may be many devices exhibiting a particular security code. Each device may also exhibit a unique serial number, making each device trackable. Authorized articles may be readily identified in the field because the security provider has provided only the approved quantity of devices. Unauthorized "back-door" and overrun products and documents may be authentic, but they are recognized as being unauthorized because they either have no security device affixed, or they have a featureless imitation security device that is easy to spot as a fake.

The security provider may record which ranges of serial numbers are sent to each production site, enabling the tracing of authorized articles back to their place of origin. The security provider may also record the security code for each serial number, creating a database of valid code/number combinations for validating authentication requests from the field. The security provider may read the serial numbers from the devices prior to shipment using an optical sensor coupled to an optical character recognition apparatus. The optically variable security codes may be read by a similar apparatus, modified to read from several different observation points, or by placing the security code in a machine-readable format in addition to the secure optically variable format. Such a machine readable format may include, for example and without limitation, a bar code or simple printing.

The security devices may be affixed to the articles by any known or suitable convenient means, such as for example and without limitation, by an adhesive. The devices may also be embedded into the articles, such as for example and without limitation, with a security thread in a bank note application. In some articles, such as optical discs, the security device may be formed directly into the article. The devices may be placed in plain sight on the face of a product, package, or document, or they may be covered with removable layers or sealed inside packaging to control access until a certain point of use.

Once the articles are produced, affixed with security devices, and entered into the distribution chain, users such as consumers, retailers, and security enforcement personnel are able to easily determine whether the product or document is authentic by inspecting the security device and/or by sending an authentication request to the security provider's central database. Photographic and scanned copies of the security device will be readily apparent to inspecting users because the optically variable image and security code elements will not change when the device is tilted. Users will be able to discern immediately if the device is counterfeit, and if it is, then the article may be deemed counterfeit as well.

If a user determines that the security device appears authentic, the user may send an authentication request to the database by any of several convenient means, for example and without limitation, by written message, voice telephone, telefacsimile, SMS text messaging, Internet, or Mobile Web. An optical sensor coupled with an apparatus configured to read the serial number and security code directly from the security device may be used to input the serial number and security code into a computer or electronic messaging system, and the number and code may be sent electronically to the central database as an electronic authentication request. Such an optical sensor may be a specialized apparatus designed especially to read the security device design and format, or it may be as simple as a generic cell phone camera with appropriate accompanying optical character recognition software. In the case of a cell phone camera, the cell phone may also transmit the authentication request to the database over a wireless telephone network.

However, the authentication request need not involve sensors and computers. The user may, for example, simply read the serial number and security code from the security device, call a database attendant, and make an authentication request by voice telephone. Alternatively, the user may write the serial number and security code on a piece of paper and fax or even mail the authentication request to the database attendant. In one non-limiting embodiment, the authentication request may be made by the user at a proprietary website and transmitted over the Internet, and the authentication report may be delivered back to the user's interface, providing an immediate, real-time validation of the authenticity of the product or document. However, the inventive method does not limit users to this mode of communication. The flexibility to use communication means that are more or less sophisticated assures that users anywhere in the world, with access to communications of any technological level, will be able to check the authenticity of an article by using this method.

In one non-limiting embodiment, the database may be an electronic database where security device data is stored in a computer-accessible memory apparatus and authentication requests are delivered to the computer by electronic communication. Upon receipt of an authentication request, automated software instructs the computer to query the database for the combination of serial number and security code provided by the user. If the combination of number and code is found in the database, the computer reports back to the user via electronic means that number/code combination was found and that therefore the product or document is authentic and authorized. If the number/code combination is not found in the database, the computer reports back this outcome. However, the database need not be electronic; it may be as simple as a list of valid number/code combinations written on paper or index cards, and the search may be performed by a human database attendant who then reports back to the requesting user.

The database may be operated, controlled, and maintained by the security provider, brand owner or government agency, or a third party database administrator. The database may serve a single product or document type or many such types. Likewise, it may serve a single brand owner or government agency, or many. Further, while it is envisioned that the steps of producing the security devices, affixing them to products or documents, and sending an authentication request are performed in different locations, as this is the most useful configuration for widely-distributed consumer products and documents, performance of some or all of these steps at the same location is also possible, and is contemplated for specialty products and documents that are not widely circulated.

In addition to storing valid serial number/security code combinations for handling authentication requests, the database may also keep track of the location and volume of authentication requests and field control scans in order to track the location and movement of products and documents. Additional information can be collected from authentication requests to aid in such tracking. For example and without limitation, when an authentication request is received, the date and time of the request and the location from which the request originated can be recorded, and a count of the number of authentication requests received that are associated with each serial number can be maintained. Then, by analyzing the number, timing, frequency, and/or location of authentication requests received, by serial number or in total, potential fraudulent activity may be identified.

When an article is affixed with a security device according to this method, the article gains increased usefulness, authority, and value because users are assured that the article is authorized and genuine. Users find it very intuitive to simply enter a serial number and security code into an authentication portal and receive an immediate response. No special tools or knowledge are needed.

DESCRIPTION OF THE PREFERRED EMBODIMENTS

Figure 1A:
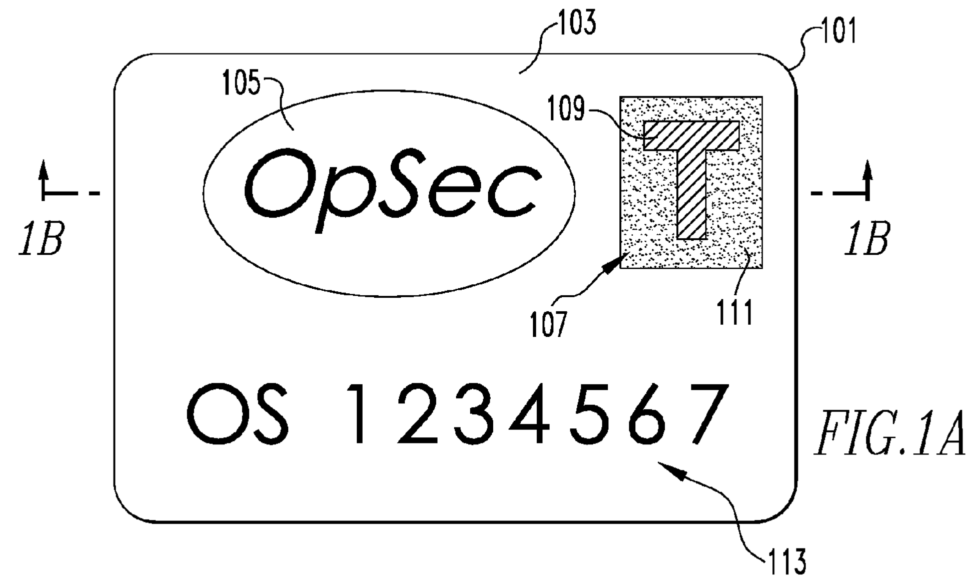
FIG. 1A is a top plan view of a security device in accordance with an embodiment of the disclosed concept.

It will be appreciated by those skilled in the art that changes could be made to the embodiments described herein without departing from the scope of the broad inventive concept thereof. For example, it is understood that all aspects and embodiments of the present disclosed concept can be related to any item one wished to authenticate, validate, or track, such as but not limited to products and documents. It is understood, therefore, that this disclosed concept is not limited to the particular embodiments disclosed, but it is intended to cover modifications that are within the spirit and scope of the disclosed concept, as defined by the appended claims.

As employed herein, the term "optically variable device" (OVD) refers to a visual device that creates a change or shift in appearance, such as, for example and without limitation, a change in color or shape, when observed from different relative observation points. The term is used herein in its conventional broad sense and includes the use of a single optical element alone or multiple optical elements which may or may not be arranged so that they are touching each other, overlapping, or physically in close proximity to each other. Such elements may include, for example and without limitation, holograms, diffractive gratings, liquid crystal constructs, color-shifting inks or pigments, or micro-lens integral or autostereoscopic imaging devices.

As employed herein, the term "article" refers to an item, product or document on which the exemplary security device is employed, and expressly includes, for example and without limitation, articles used in brand protection, high-security, identification, and banking markets, such as, for example and without limitation, branded products, packaging labels, optical discs, identification cards, credit cards, debit cards, smart cards, organization membership cards, security system cards, security entry permits, banknotes, checks, fiscal tax stamps, passport laminates, legal documents, and other information-providing items wherein it may be desirable to validate the authenticity of the item and/or the reproduction thereof.

As employed herein, the term "users" refers to any persons or entities that wish to determine the authenticity of an article, such as purchasers, consumers, holders for value, holders in due course, owners, manufacturers, issuers, brand owners, government agencies, and security enforcement personnel such as treasury officials, customs inspectors, and immigration officials.

The device and method of the disclosed concept provide for the verification of the authenticity of articles by the use of a two-tiered approach to security. One tier is the use of an OVD affixed to the article to deter counterfeiters. The OVD includes an optically variable security code, a random sequence of visual elements encoded into the optically variable device so that only one such element is visible from any given observation point. The elements may be, for example and without limitation, alphanumeric characters, shapes, icons, or images. The OVD may also include an optically variable image.

OVDs can only be reproduced by sophisticated and expensive origination equipment which most counterfeiters lack. Thus, the use of an OVD defeats the widespread use of readily available imaging and printing technologies by those counterfeiters who lack origination skills and equipment. In addition, OVDs are widely recognized by the public as security devices and therefore provide a focal point for distinguishing authentic products from those supplied by professional counterfeiters.

The second tier is the use of a serial number. The serial number provides a unique identifier for authentication queries and for tracking and control purposes. Each serial number is associated with a random security code that is not predictable by counterfeiters. Thus, those counterfeiters that have the skill and resources necessary to duplicate an OVD with an optically variable security code will be unable to guess the serial numbers/security code combinations that appear on valid articles.

FIG. 1A shows a top view of one non-limiting embodiment of the security device 101. The security device 101 comprises a substrate 103 with an optically variable security image 105 and an optically variable security code 107 disposed thereon. In the non-limiting example of FIGS. 1A and 1B, the optically variable security code 107 is comprised of a sequence of three upper case letters 109, "KTV," against a contrasting background 111. Only one such letter 109, however, is observable from a given predetermined observation point, e.g., a viewer can see only one letter 109 at a time (see, for example and without limitation, only letter "T" is observed from the plan view perspective of FIG. 1A). A serial number 113 is printed on the security device 101 with an ink-jet printer. The serial number 113 may also be laser ablated or engraved.

Figure 1B:
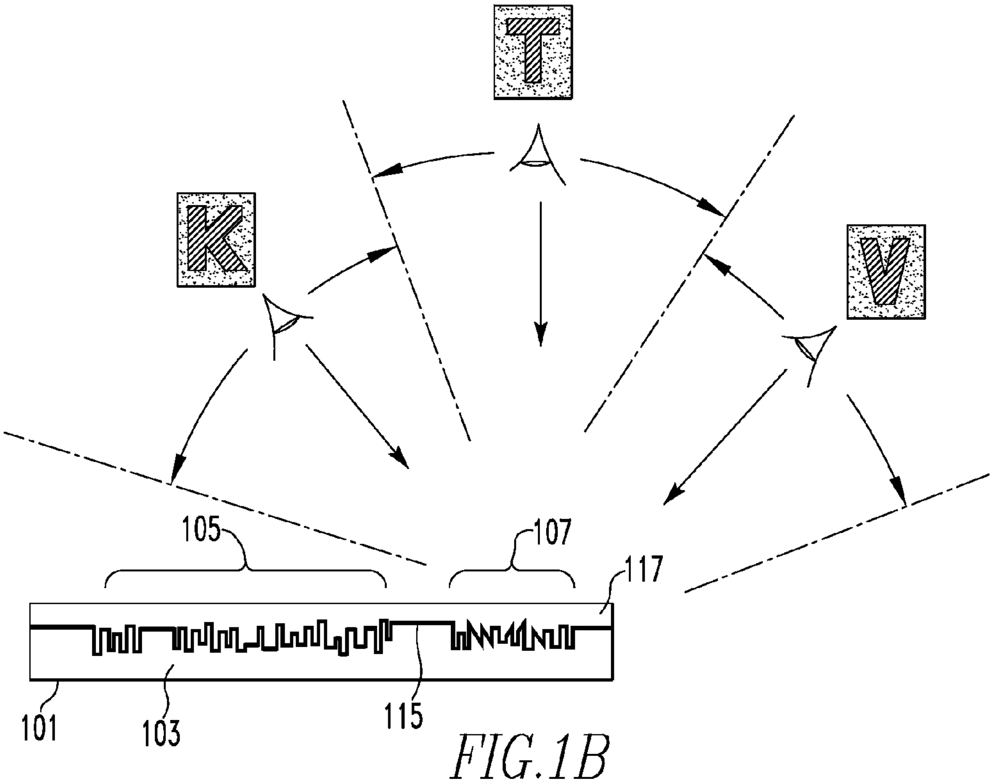
FIG. 1B is a section view taken along line 1B-1B of FIG. 1A.

FIG. 1B shows a section view of the same security device 101. In the example shown, the device 101 comprises a substrate 103 with an optically variable image 105 and an optically variable security code 107 disposed thereon. The optically variable image 105 and security code 107 are formed in the substrate 103, which is then covered with a metalized layer 115 and a protective layer 117. As shown, the optically variable security code 107 is preferably formed so that three upper case letters are seen, one from each of three observation points, K, T, and V. When the user observes the security code 107 from observation point K, the character "K" is observed. As the user tilts the security device 101 so that the observation point changes to point T, the character "K" disappears from view and the character "T" appears. Finally, as the user tilts the device 101 still further so that the observation point changes to point V, the character "T" disappears and the character "V" appears. Thus, by tilting the security device 101, and necessarily also the security code 107 disposed thereon, from right to left (i.e., from a position where the right side is further from the user than the left, to a position where the left side is further from the user than the right), the user observes the sequence of characters "K", "T", and "V", revealing the security code.

The optically variable security code 107, as well as the optically variable security image 105, is formed from diffractive structures by methods well known in the art. A collection of diffractive structures is designed that will create the three-frame animated effect of the characters "K", "T", and "V". This may be accomplished, for example and without limitation, by forming the security code 107 from a plurality of pixels that, when coupled with a reflective backing, reflect light in one, two, or three different directions or by combining pixels that reflect light in only one direction. The pixels are organized so that light reflected from the security code 107 to the left forms the character "K", light reflected substantially perpendicular to the security code 107 forms the character "T", and light reflected from the security code 107 to the right forms the character "V". A suitable computer-based design application may be used to assist in the design of the diffractive structures. The elements of the security code 107 need not be alphabetic characters, but may alternatively and/or additionally include numerals, shapes, and images, or sets of characters, numerals, shapes, and images. The length of the security code 107 in elements is of course not limited to three as in the figured embodiment, but may be of any alternative length (not shown), without departing from the scope of the disclosed concept. It will also be appreciated that while the non-limiting example shown and described herein illustrate a security code 107 that is visible to the naked eye, security codes, images, and/or serial numbers that are not visible by the naked eye (e.g., without limitation, machine readable security devices) are also within the scope of the disclosed concept.

Once designed, the pattern of diffractive structures is exposed in a photosensitive substrate using a laser or e-beam apparatus. The substrate is processed and a nickel shim is made using techniques well-known in the art. The shim is then used to emboss, cast, or mold the diffractive structures into the substrate 103. The optically variable security image 105 and the optically variable security code 107 may be designed, exposed, and processed together as a single piece, in which case their impressions will be made by the same shim. Alternatively, the security image 105 and the security code 107 may be made separately and reside on two different shims. In the case of separate shims, the shims can be mounted together so that both the security image 105 and the security code 107 are embossed, cast, or molded on the same pass, the shims can be mounted at different stations in the same embossing or casting line, or the shims can be mounted on different lines, resulting in a two-pass operation.

Although FIG. 1B shows a security code 107 comprised of the characters "K", "T", and "V", to provide a powerful anti-counterfeiting effect, the security devices of this example should be made with as many different three-character combinations as possible. In a preferred security device production process, each device produced in one revolution of an embossing or casting cylinder would be designed with a different three-letter security code. The number of different codes possible in a production run would vary, depending on the size of the security devices and the size of the embossing or casting cylinder. Subsequent production runs would have devices with altogether different security codes.

The substrate 103 comprises a generally planar clear plastic film made from any suitable material, such as, for example, polyester, polystyrene, polypropylene, or cellulose acetate. The metalized layer 115 is formed on the embossed, cast, or molded surface relief containing the optically variable information and can be of any known or suitable reflective metal, such as, for example, aluminum, copper, silver, or gold. The metalized layer 115 can be applied by any suitable application method, such as vacuum evaporation or sputtering, and is thick enough so that as much light as possible is reflected, maximizing the brightness of the viewed optically variable images. A protective layer 117 is disposed over the metalized layer to protect the optically variable security image 105 and security code 107 from damage. The protective layer 117 can be any suitable clear plastic film such as, for example, polyester.

The substrate 103 can be attached to a release layer with a pressure-sensitive adhesive layer to form a pressure sensitive label, or it can be attached to a flexible carrier sheet with a heat-sensitive release coating to form a hot stamping foil. The security device 101 may be supplied as a simple transfer film with an adhesive added at the point of affixing to an article. The security device 101 can be supplied in the form of a laminate or overlay; in this case the metalized layer 115 is either formed thin enough to allow an observer to view information through the applied security device 101, or it is discontinuous, exhibiting one or more windows through which information beneath the applied device can be observed. The security device 101 can also be in the form of a security thread, stripe or patch, and simply embedded into an article without any adhesive. In some cases, the substrate 103 may be an integral part of the article, such as, for example, when the article is an optical disc.

In one non-limiting embodiment, the optically variable security image 105 and the optically variable security code 107 are based on diffractive structures, but they may be based on other OVD technologies, such as, for example, holographic methods, micro-lens integral and autostereoscopic imaging methods, and/or methods using cholesteric liquid crystals or color-shifting inks. In all of these technologies, methods of formation of multi-channel effects such as those required for the optically variable security code are well known in the art.

EXAMPLE

The following EXAMPLE is provided for illustrative purposes only, to further illustrate the disclosed concept. It is not meant to limit the scope of the disclosed concept in any way. Specifically, in one non-limiting EXAMPLE, a preferred security device production run may occur as follows. A brand owner requests 200,000 pressure sensitive labels. The security device provider creates a nickel shim featuring an optically variable security image that will appear on all labels. The provider also creates 20 separate nickel shims, each comprising a different optically variable security code made up of three upper-case letters and a machine-readable bar code representing the three-letter code. Using recombination methods well known in the art, the security image shim is "stepped out" to form a production master with 20 copies of the security image in a 4 by 5 array. Each security code is then "dropped in" using heat and pressure to form a composite plate having 20 different combinations. Alternatively, the recombination may be done optically before the shims are made. In either case, the resulting production master plate creates 20 different labels per impression. Ten thousand impressions are made on a master roll of substrate using a repeating cylinder, resulting in 200,000 labels. The master roll of embossed substrate is converted into labels by metalizing and the addition of a protective layer, adhesive and a paper release backing. For ease of handling, the master roll is then slit and cut into 200 small rolls of 1,000 labels each.

Each small roll is fed into an ink-jet printer where each label is printed with a serial number. The numbers may be sequential or non-sequential, but each number is unique. By shuffling the order in which the rolls are fed into the printer, a pseudo-random association may be created between sequential serial numbers and the optically variable security codes. The printed rolls are fed into an optical reader that reads the serial numbers and security code bar codes on each label. This information is transmitted electronically to a computerized database for storage. Finally, the rolls of labels are shipped to the manufacturing facility where the labels are applied to articles. Each article is transferred into a market supply chain and eventually ends up with a user, who is then able to verify the authenticity of the article by reading the serial number and security code on the label and sending this information to the database. If that number/code combination is found in the database, then the user is informed of that fact and the authenticity of the article is verified.

For greater security, more security codes may be used. In the EXAMPLE above, four production masters could be made, each with 20 different security codes, for a total of 80 different security codes. Each master would be used to produce 2,500 impressions, for a total of 200,000 labels. Further, security codes are not limited to only three characters or elements. The use of security codes with more than three characters increases the total number of possible security codes; the use of as many different security codes as possible is preferred, as it decreases the chance a counterfeiter will correctly guess a serial number/security code combination that actually appears on a valid label.

Figure 2A:
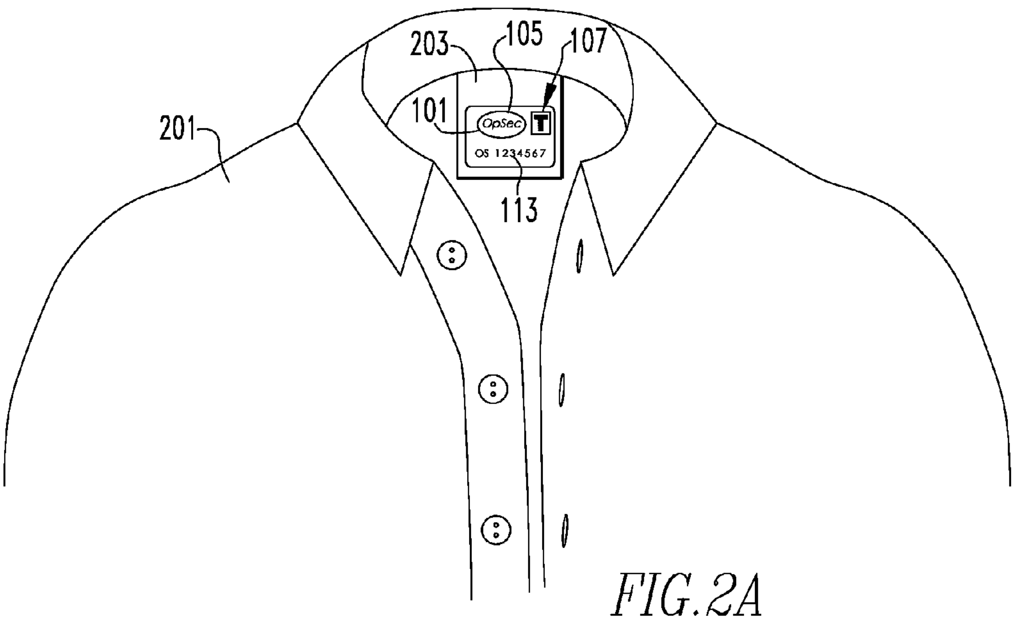
FIG. 2A is an isometric view of a security device affixed to an article of clothing in accordance with an embodiment of the disclosed concept.

FIGS. 2A-2G illustrate embodiments of security devices 101 that are affixed in different ways to articles such as products and documents to allow verification of authenticity and to discourage counterfeiting. FIG. 2A shows a security device 101 affixed directly to an article 201 that is subject to counterfeiting. A security device in the form of a pressure-sensitive label 101 is affixed to the collar tag 203 of a shirt 201. An optically variable security image 105, an optically variable security code 107, and a printed serial number 113 are disposed on the security device 101.

Figure 2B:
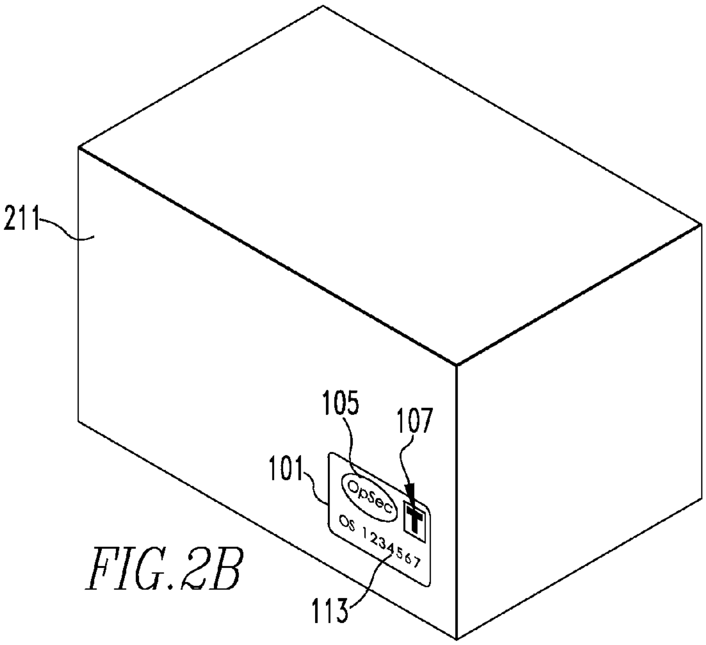
FIG. 2B is an isometric view of a security device affixed to a packaged product in accordance with an embodiment of the disclosed concept.

FIG. 2B shows a security device 101 affixed to the packaging or container 211 of an article. A security device in the form of a pressure-sensitive label 101 is affixed to the exterior surface of a packaged article 211. An optically variable security image 105, an optically variable security code 107, and a printed serial number 113 are disposed on the security device 101.

Figure 2C:
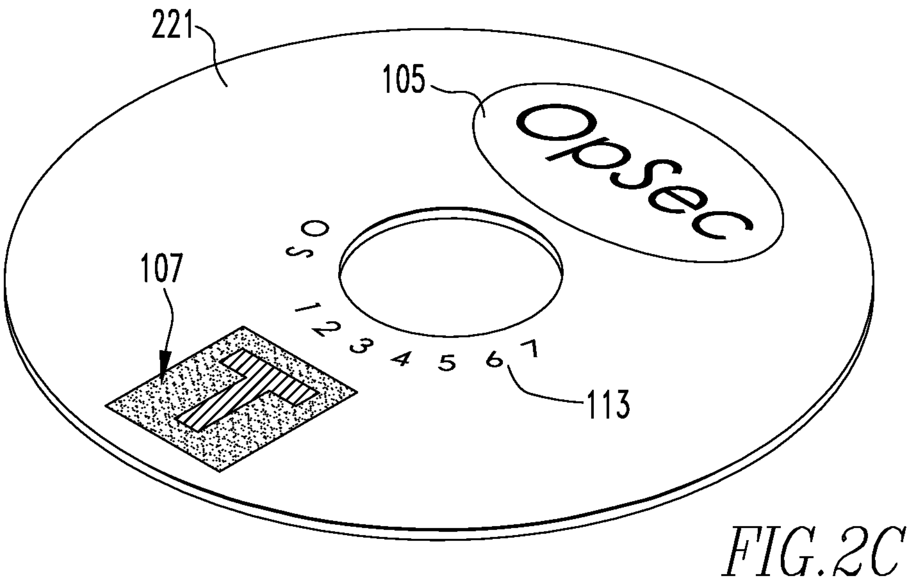
FIG. 2C is an isometric view of a security device integrated into an optical disc in accordance with an embodiment of the disclosed concept.

FIG. 2C shows a security device 101 integral with an article 221, such as an optical disc. The surface relief patterns containing the optically variable information for the security image 105 and the security code 107 are embossed, cast, or injection molded directly into the material of the optical disc 221. The serial number 113 is printed or laser ablated or engraved.

Figure 2D:
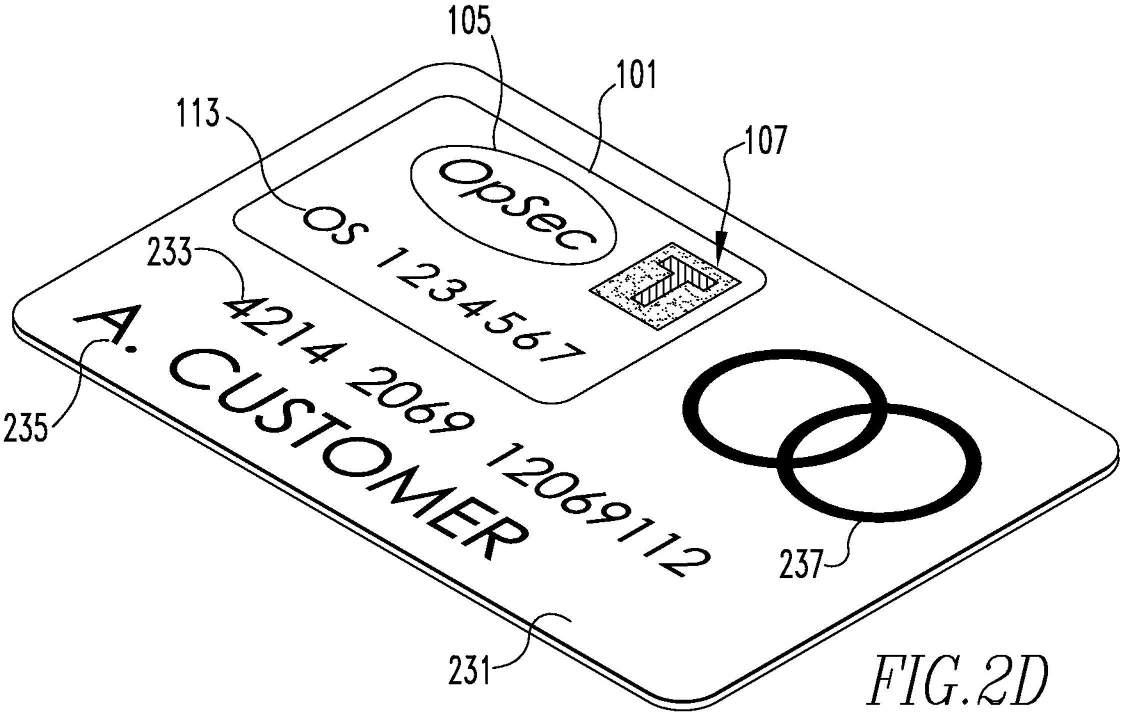
FIG. 2D is an isometric view of a security device affixed to a credit card in accordance with an embodiment of the disclosed concept.

FIG. 2D shows a security device 101 affixed to a credit card 231. Security devices made for credit cards are typically produced as hot stamping foils. The credit card 231 exhibits various information on its face, including the account number 233, the customer's name 235, and the issuing bank's name and logo 237. The security device 101 includes an optically variable security image 105, an optically variable security code 107, and a printed serial number 113.

Figure 2E:
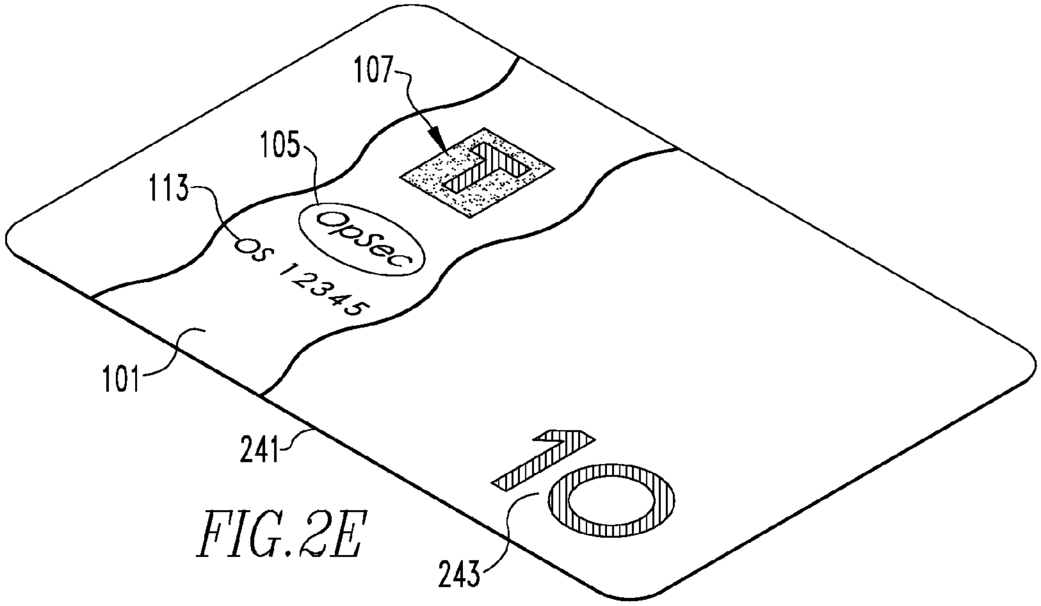
FIG. 2E is an isometric view of a security device embedded into a bank note in accordance with an embodiment of the disclosed concept.

FIG. 2E shows a security device 101 in the form of a security strip (shown in enlarged exaggerated form for ease of illustration) embedded in a bank note 241. The bank note 241 exhibits a value denomination 243 as well as the security strip 101, which includes an optically variable security image 105, an optically variable security code 107, and a printed serial number 113.

Some or all of the information on the security device may be hidden from view until the article is used, prepared for use, or disassembled, or the article's packaging is opened. For example, on the security device 101 illustrated in FIG. 2A, the optically variable security code 107 may be located at the top edge of the device 101 and affixed at the top edge of the collar tag 203 so that when the tag 203 is attached to the shirt 201 the security code 107 on the security device 101 is sewn into the seam of the shirt 201 and therefore not visible to an observer until the seam of the shirt 201 is disassembled and the tag 203 removed.

Figure 2F:
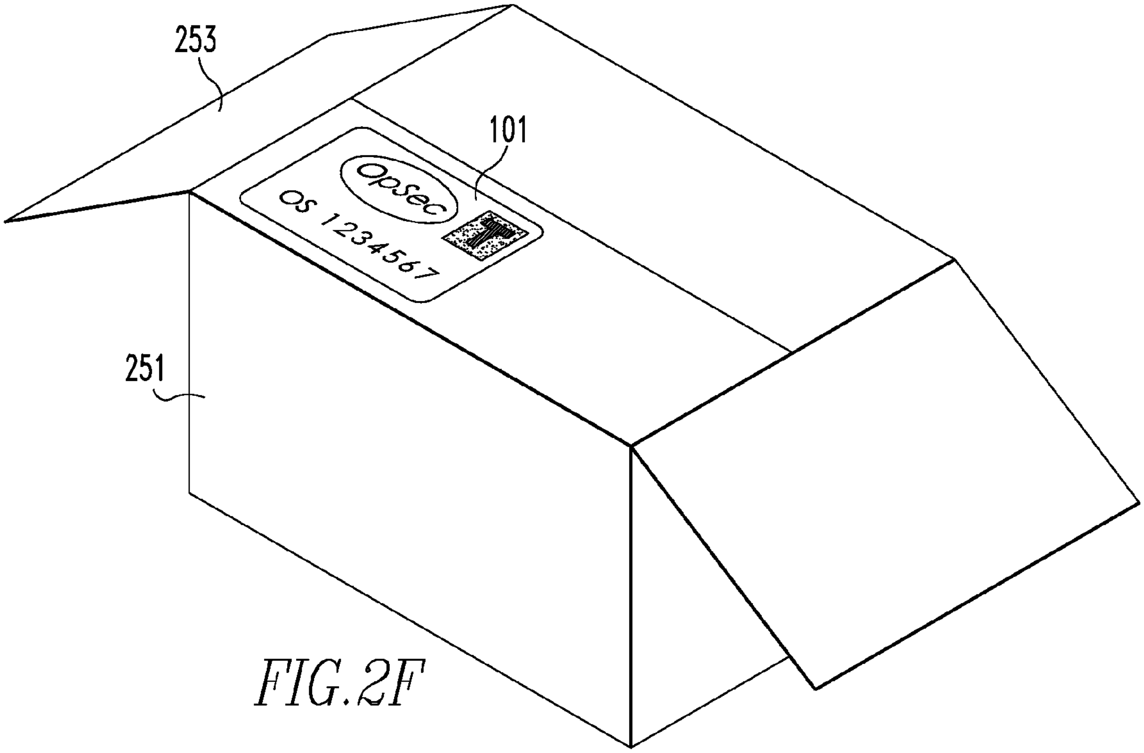
FIG. 2F is an isometric view of a security device affixed to a packaged product in accordance with an embodiment of the disclosed concept.

FIG. 2F shows a security device 101 affixed to the packaging 251 of an article in such a way that it is not visible until the packaging 251 is opened. When the package 251 is sealed, flap 253 covers the security device 101, preventing any observation. When the package 251 is opened, flap 253 is lifted, allowing the user to view the security device 101.

Figure 2G:
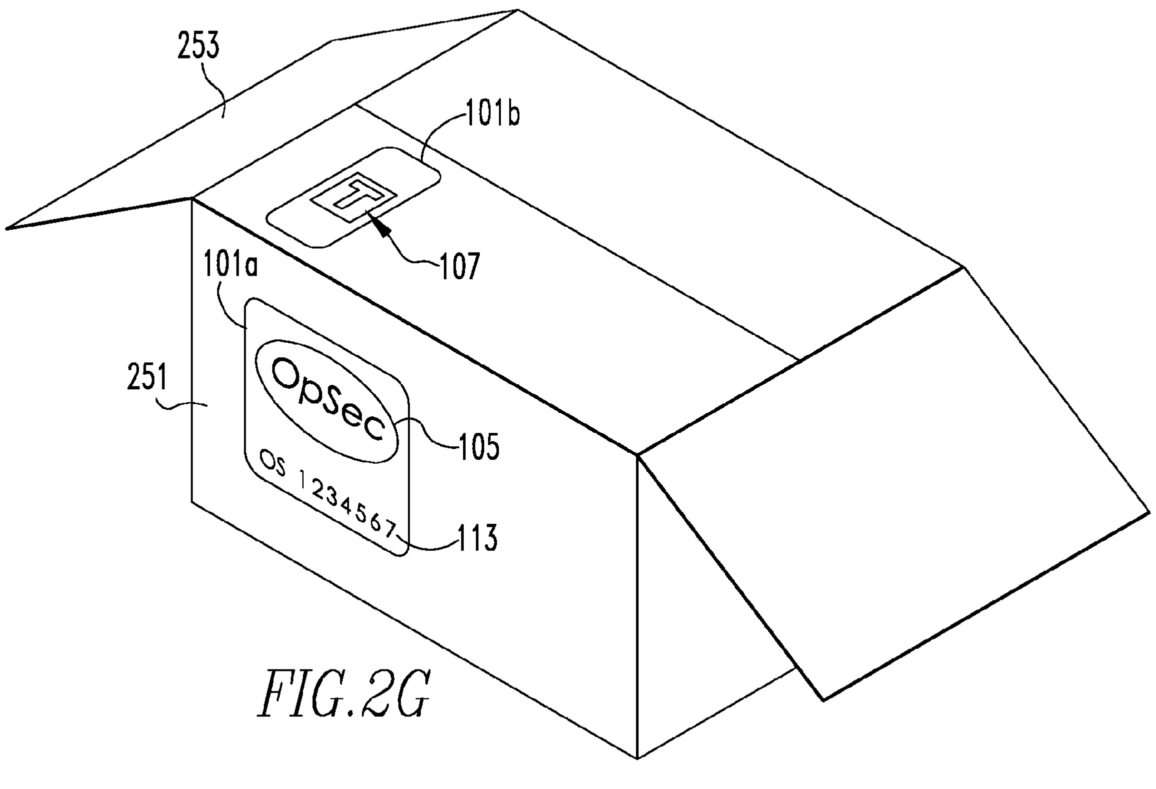
FIG. 2G is an isometric view of a security device affixed to a packaged product.

FIG. 2G shows a security device that has been cut into two portions, each portion being affixed at a different location on the packaging 251 of an article. Portion 101*a*, including the optically variable security image 105 and printed serial number 113, are affixed on an outside surface of the packaging 251 so that they are visible without opening the package 251. Portion 101*b*, including the optically variable security code 107, is affixed beneath the flap 253. When the package 251 is sealed, flap 253 covers the security device portion 101*b*, preventing observation. Only security device portion 101*a* is visible until the package 251 is opened. Security device portions 101*a* and 101*b* can be produced together as a single pressure-sensitive label, then simply die cut into two portions before affixing to the package 251.

Figure 3:
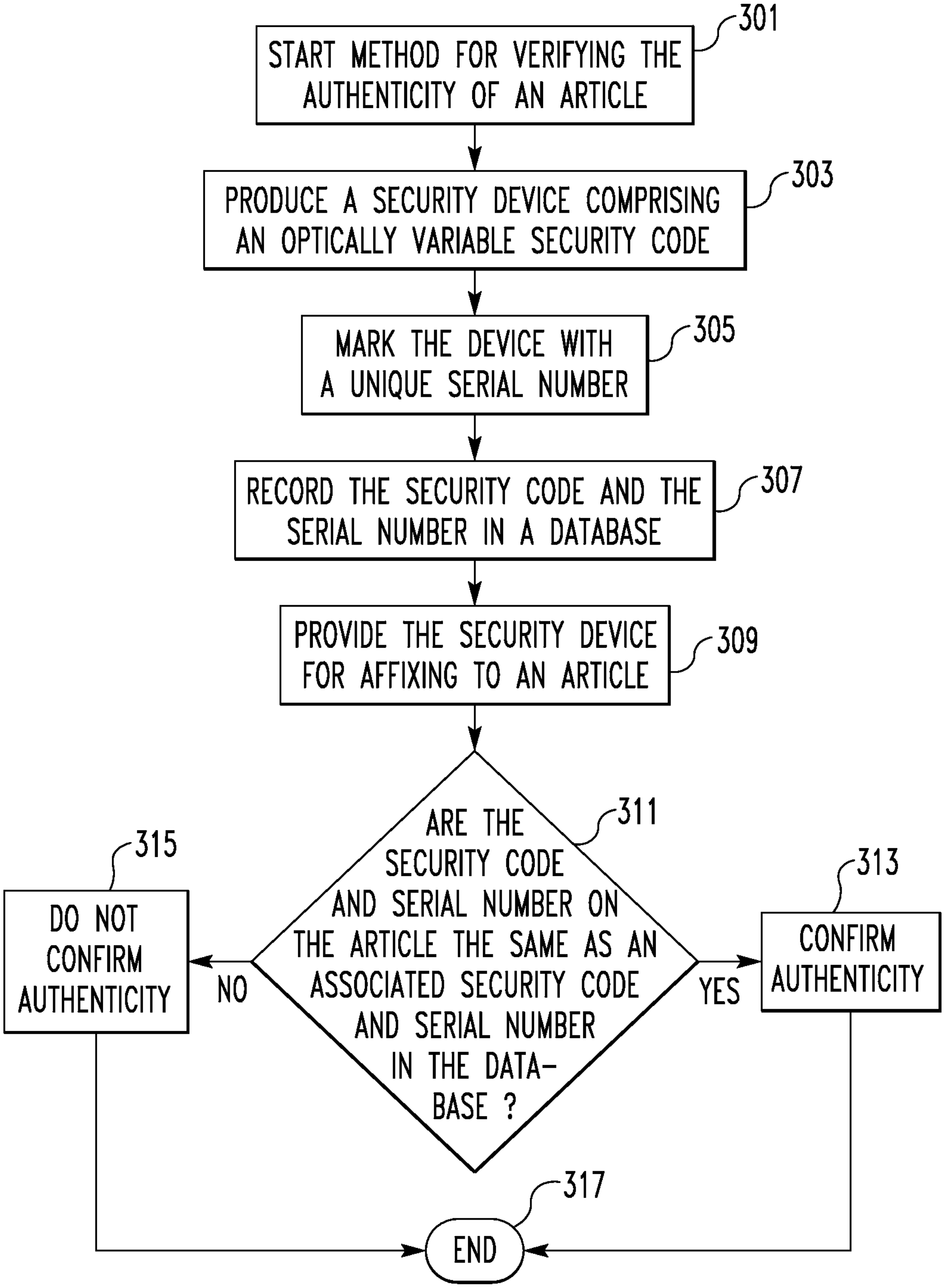
FIG. 3 is a flow chart showing a method of verifying the authenticity of an article according to an embodiment of the disclosed concept.

The disclosed concept also provides methods of verifying the authenticity of an article. FIG. 3 is a flow chart of such a method. The method begins at 301 and comprises producing a security device at 303, wherein the security device comprises an optically variable security code. At 305 the security device is marked with a unique serial number. The serial number and the security code are recorded together in a database at 307 and represent a valid number/code combination. The security device is provided to the originator of the article for affixation at 309. The authenticity of the article is checked at 311. By way of example and without limitation, an authentication request may be sent to search the database, wherein the authentication request may be sent and/or received by any known or suitable means such as, for example, written message, voice telephone, telefacsimile, SMS text messaging, internet, mobile web or the like. If the security code and the serial number that appear on the security device are the same as an associated security code and serial number in the database, then authenticity of the article is confirmed at 313. If the security code/serial number combination from the article does not match a security code/serial number combination in the database, then authenticity of the article is not confirmed at 315. The method terminates at 317. It will be appreciated, therefore, that a suitable authentication report may be delivered by any known or suitable means such as, for example, written message, voice telephone, telefacsimile, SMS text messaging, internet, mobile web or the like.

Accordingly, among other benefits the disclosed concept provides a combination of an optically variable image and random security code with a unique serial number to establish a robust anti-counterfeiting device that is very difficult for counterfeiters to defeat. Optically variable images cannot be copied using even the best computer-based imaging systems available; they can only be reproduced by sophisticated and expensive specialized origination equipment which most counterfeiters lack. Thus the optically variable image on the security device will deter most counterfeiters. On the other hand, sophisticated counterfeiters that have the ability to duplicate optically variable imagery will be unable to generate valid security code/serial number combinations except by tedious physical field examination of valid security devices.

In addition, because the security code and serial numbers are obvious and easy to read, the instant security device also provides an easy way for consumers, retailers and security enforcement personnel (such as treasury officials, customs inspectors, and immigration officers) to validate the authenticity of articles by simply querying a central database wherein the security code/serial number combinations of all valid devices have been stored.

As an additional benefit, the serial numbers can be used for the tracking of products and documents. The database can store the location of each authenticity query and field control scan in the supply chain, providing valuable location and movement information to the brand owner or government agency.

While a specific embodiment of the disclosed concept is described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the appended claims and any and all equivalents thereof.

What is claimed is:

1. A method for verifying the authenticity of an article, comprising the steps of:

providing a production master plate being structured to produce from one impression a plurality of security devices, each having a different optically variable security code;

producing a plurality of security devices from the impression of the production master plate, each of said plurality of security devices comprising:

an optically variable security code different from optically variable security codes of others of the plurality of security devices produced from the impression of the production master plate, the optically variable security code comprising a plurality of individual elements, including a first element and a second element, wherein at a first predetermined observation point the first element is visible and the second element is not visible, and at a second predetermined observation point the second element is visible and the first element is not visible; and a unique serial number, the unique serial number being disposed on a first portion of a corresponding one of the plurality of security devices and the optically variable security code being disposed on a second portion of the corresponding security device, providing a first security device from the plurality of security devices for affixing to an article;

recording the associated security code and serial number of the first security device in a database;

receiving an authentication request from a user of the article;

sending an authentication report to the user;

wherein the authentication report informs the user whether authentication is confirmed; and wherein authentication is confirmed if the security code and the unique serial number on the device-affixed article is the same as an associated security code and serial number recorded in the database.

2. The method of claim 1 wherein each of the first element and the second element is an alphanumeric character.

3. The method of claim 1 wherein the security device further comprises a machine-readable representation of the optically variable security code.

4. The method of claim 1 wherein the unique serial number is machine-readable.

5. The method of claim 1 wherein the database is electronic.

6. The method of claim 1 wherein the authentication request is received by one of the means in the group consisting of: written message, voice telephone, telefacsimile, text messaging, Internet, and Mobile Web.

7. The method of claim 1 wherein the authentication report is sent by one of the means in the group consisting of written message, voice telephone, telefacsimile, text messaging, Internet, and Mobile Web.

8. A system for verifying the authenticity of an article comprising a security device affixed to the article, wherein the security device is produced from a production master plate being structured to produce from one impression a plurality of security devices each having a different optically variable security code, wherein the security device comprises:

a substrate;

an optically variable security code different from optically variable security codes of other security devices produced from the impression of the production master plate, the optically variable security code comprising a plurality of individual elements, including a first element and a second element, wherein at a first predetermined observation point the first element is visible and the second element is not visible, and at a second predetermined observation point the second element is visible and the first element is not visible; and a serial number;

wherein the security code and the serial number are recorded together in a database of valid combinations of security codes and serial numbers, and wherein the authenticity of the article is verified when the security code and the serial number of the security device affixed to the article are found together in the database of valid security code and serial number combinations.

9. The system of claim 8 wherein each of the first element and the second element is an alphanumeric character.

10. The system of claim 8 wherein the security device further comprises a machine-readable representation of the optically variable security code.

11. The system of claim 8 wherein the serial number is machine-readable.

12. The system of claim 8 wherein the database is electronic.

13. The method of claim 1 wherein the plurality of individual elements includes a third element; wherein at a third predetermined observation point the third element is visible and the first and second elements are not visible; and wherein at each of the first predetermined observation point and the second predetermined observation point the third element is not visible.

14. The method of claim 1 further comprising employing as said production master plate a plurality of production master plates, wherein each of the production master plates is structured to produce a plurality of security devices each having a different optically variable security code than other security devices produced by the same production master plate and other security devices produced by other production master plates of the plurality of production master plates.

15. The system of claim 8 wherein the security device is produced from one production master plate of a plurality of production master plates, wherein each of the production master plates is structured to produce a plurality of security devices each having a different optically variable security code than other security devices produced by the same production master plate and other security devices produced by other production master plates of the plurality of production master plates.

* * * * *